(12) United States Patent
Stevens et al.

(10) Patent No.: US 6,753,055 B2
(45) Date of Patent: Jun. 22, 2004

(54) HEAT EXCHANGERS CONTAINING LIQUID CRYSTALLINE POLYMER LAYERS

(75) Inventors: Kenneth Earl Stevens, Kingston (CA); Pallatheri Manackal Subramanian, Hockessin, DE (US)

(73) Assignee: DuPont Canada, Inc., Mississauga (CA)

(*) Notice: Subject to any disclaimer, the term of this patent is extended or adjusted under 35 U.S.C. 154(b) by 0 days.

(21) Appl. No.: 10/322,178

(22) Filed: Dec. 18, 2002

(65) Prior Publication Data

US 2003/0091772 A1 May 15, 2003

Related U.S. Application Data

(63) Continuation of application No. 08/906,954, filed on Aug. 5, 1997, now abandoned.

(60) Provisional application No. 60/025,188, filed on Sep. 11, 1996.

(51) Int. Cl.$^7$ .............................................. C08K 19/00
(52) U.S. Cl. .................................. 428/36.91; 428/35.7
(58) Field of Search .............................. 428/35.7, 36.91

(56) References Cited

U.S. PATENT DOCUMENTS 6,146,764 A * 11/2000 Suokas et al. ............... 428/412

* cited by examiner

*Primary Examiner*—Sandra M. Nolan

(57) ABSTRACT

Heat exchangers which have heat exchange structures made from at least one layer of an isotropic polymer and at least one layer of a thermotropic liquid crystalline polymer are particularly useful where light weight is important, such as in automobiles, trucks and aircraft.

19 Claims, 1 Drawing Sheet ns a heat exchanger wherein the
HEAT EXCHANGERS CONTAINING LIQUID CRYSTALLINE POLYMER LAYERS This is a continuation of application Ser. No. 08/906,954, filed Aug. 5, 1997 and now abandoned, which claims priority from provisional application U.S. Serial No. 60/025,188, filed Sep. 11, 1996.

FIELD OF THE INVENTION

This invention concerns a heat exchanger wherein the material which comprises the heat exchange surface structure contains at least one layer of a thermotropic liquid crystalline polymer and at least one layer of an isotropic thermoplastic.

TECHNICAL BACKGROUND

Heat exchangers are common pieces of equipment, used in many applications, such as chemical processes, in automotive uses, household uses, and others. Heat exchangers are most commonly used to transfer heat between two fluids such as two liquids, a liquid and a gas, or between two gases. Traditionally, the materials used for the heat exchange surfaces are metals, which usually have relatively high thermal conductivities and good strength. However metals have certain drawbacks, such as high forming and assembly costs, relatively high densities and therefore high weights, and sometimes poor corrosion resistance.

To overcome some of these disadvantages, heat exchangers using plastics have been developed. For instance, in highly corrosive environments heat exchangers using polytetrafluoroethylene (or perfluorinated tetrafluoroethylene copolymers) have been used. However plastics have some inherent disadvantages, such as poorer heat transfer coefficients, in some cases relatively poor chemical stability, and permeability to the gas(es) or liquid(s) which contact the heat exchange surfaces. However, they often offer the advantages of lighter weight and easier fabrication than metals. Therefore, improved plastic heat exchangers are being sought.

Japanese Patent Application 03/007891 describes a heat exchanger tube made from a liquid crystalline polymer and a filler having high heat conductivity. No mention is made of a tube having multiple layers of polymers.

French Patent Application 2,566,107 describes heat exchanger panels made from polymers such as polyethylene. No mention is made of layered plastics or LCPs.

U.S. Pat. Nos. 4,923,004, 4,955,435, 5,275,235 and 5,316,078 describe heat exchangers which employ various polyamides for the heat exchange surface materials. Thermotropic liquid crystalline polymers are not mentioned in these patents.

D. A. Reay, Heat Recovery Systems & CHP, vol. 9, p. 209–16 (1989), and I. H. Gross, Proceedings of Antec '93, p. 964–968 (1993) describe the use of polymers in heat exchangers. No mention is made of using layered polymer structures, nor of using LCPs.

SUMMARY OF THE INVENTION

This invention concerns, a heat exchanger containing a heat exchange surface material, comprising, a layer of a thermotropic liquid crystalline polymer and a layer of a thermoplastic.

This invention also concerns a heat exchanger panel wherein a heat exchange surface material comprises a layer of an isotropic polymer and a thermotropic liquid crystalline polymer.

By a heat exchange surface material (HESM) is meant a material which is used as part of a heat exchanger or a component thereof, and which is the material through which the major portion of the heat that is exchanged between the two fluids (gas or liquid) is meant to flow. It also performs the function of keeping the two fluids between which heat is being exchanged apart.

BRIEF DESCRIPTION OF THE DRAWINGS

Both

FIG. 1 is a schematic drawing from the side, of an apparatus for carrying out the multilayer film forming process described herein. An extruder, 1, supplies molten first thermoplastic to slit die 2 from which issues a molten multilayer thermoplastic film 3. A second extruder, 34, supplies molten second thermoplastic to slit die 2. A third extruder, 35, supplies molten third thermoplastic to slit die 2. The molten 3-layer film 3 falls vertically until it contacts approximately simultaneously surfaces 7 and 8 of rollers 5 and 6, respectively. Rolling bank 4 of thermoplastic is also present. Rollers 5 and 6 are driven in rotation in the directions shown. Multilayer film 9 exits in the gap between rollers 5 and 6, goes between (optional) cooling rollers 9 and 10, and is wound up on windup roll 11.

FIG. 2 shows the same rollers 5 and 6 and rolling bank 4 from the top, together with one method of oscillating the rollers 5 and 6 parallel to the axis (center line) of each of these rollers. Lever 9 is connected to a fixed point by pin 10, and to arms 13 and 14 by pins 19 and 20 respectively. The arms 13 and 14 are connected to rollers 5 and 6 respectively, through thrust bearings 15 and 16 respectively, allowing rollers 5 and 6 to rotate while being oscillated. Lever 9 contains slot 16 into which cam 17 is fitted. Motor 18 rotates cam 17 thereby causing lever 9 to oscillate approximately perpendicularly to the rotational axis of rollers 5 and 6. This causes 5 and 6 to oscillate in directions opposite to each other and parallel to their rotational axis.

Figure 1:
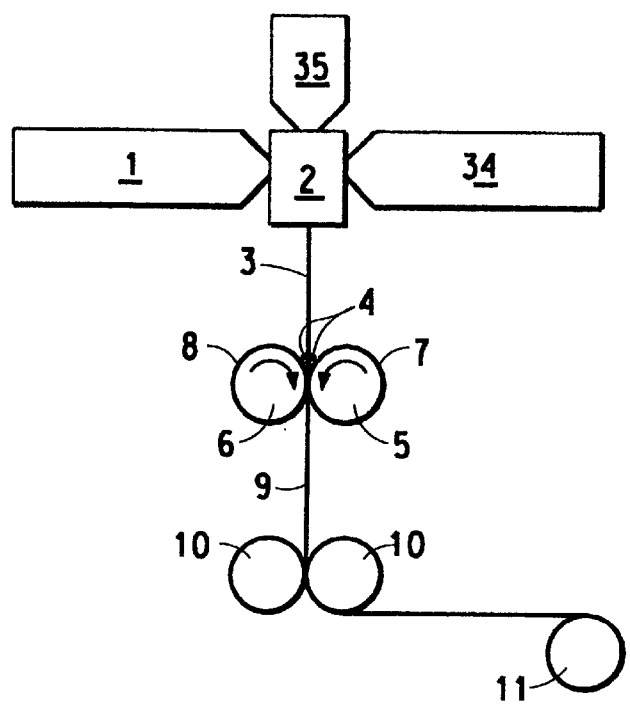
FIGS. 1 and 2 depict the apparatus that is used to produce the film as described in Example 9.
Figure 2:
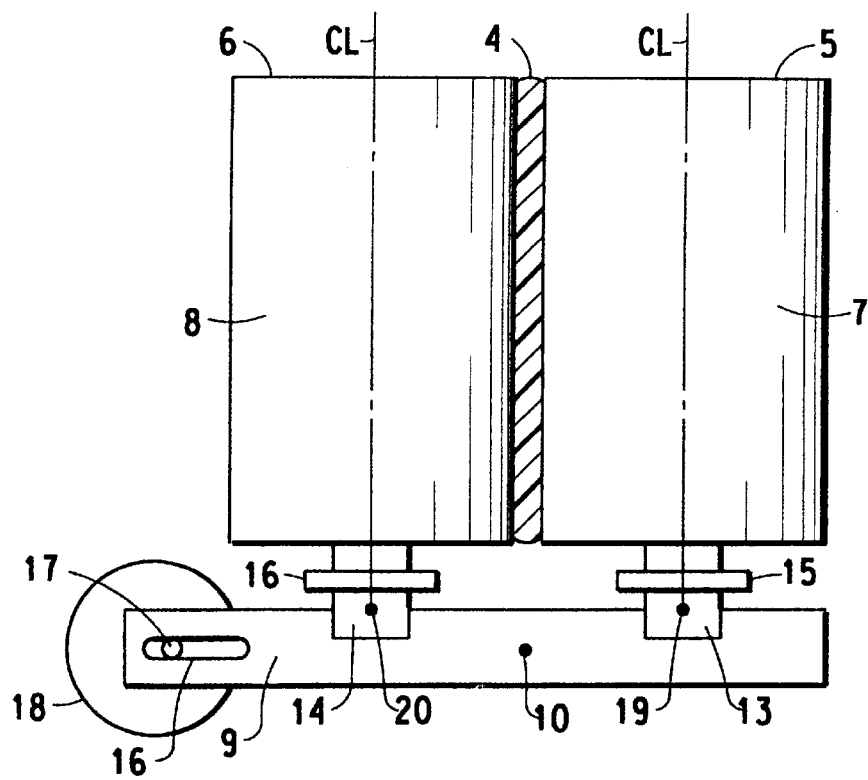

In other words in this apparatus the molten multilayer film formed in the slit die 2 is passed through rollers which oscillate along the axis of rotation of the rollers, thereby imparting a transverse (to the direction of movement of the film) shearing action to the molten polymer of the multilayer film.

DETAILS OF THE INVENTION

Heat exchangers described herein function to exchange heat (energy) between two fluids. These fluids may be gas(es) and/or liquid(s).

One of the materials which is part of the HESM is an isotropic thermoplastic (ITP). Isotropic herein means that the polymer is isotropic when tested by the TOT Test described in U.S. Pat. No. 4,118,372, which is hereby included by reference. Any ITP may be used so long as it meets certain requirements. It must of course withstand the temperatures to which the HESM is exposed, and should throughout that temperature range provide sufficient strength (together with the LCP) to the HESM to reasonably maintain its shape and contain the fluids in the heat exchanger, as needed. If it is exposed to one or more of the fluids in the heat exchanger (or any other adventitious materials that may contact it) it should be preferably reasonably chemically stable to those fluids so as to maintain its integrity.

Although various types of heat exchangers made simply of ITPs have been described, ITPs sometimes have serious drawbacks when the are the only materials in HESMs. Sometimes an ITP may not be chemically stable to one or more of the fluids in the heat exchanger, for instance, many polyesters hydrolyze or otherwise degrade in the presence of water, water-alcohol, or water-glycol mixtures, especially at higher than ambient temperatures. Many ITPs are relatively permeable to many liquids and/or gases, and therefore allow losses and/or migration of these materials in or from the heat exchanger. Some ITPs may be swollen by one or more of the fluids used in the heat exchanger thereby changing their dimensions and/or physical properties. All of the above are of course problems in plastic heat exchangers.

It has been found that a layer of a thermotropic liquid crystalline polymer (LCP) used in the HESM often alleviates or eliminates one or more of the above mentioned problems. By an LCP is meant a polymer that is anisotropic when tested in the TOT Test described in U.S. Pat. No. 4,118,372. If the LCP layer is placed between a fluid and any particular ITP in the HESM it usually protects that ITP from chemical degradation by the fluid, and/or also often protects the ITP from being swollen by that fluid. In addition, even if the ITP is swollen, the LCP because of its high relative stiffness, and the fact that it is not swollen by many fluids, help the overall HESM maintain its shape and dimensions. Also, the LCP acts as an excellent barrier layer to many fluids. For instance, in automotive heat exchangers which help cool the engine, the commonly used internal coolant is a mixture of a glycol and water, and the external coolant is air. With many ITPs diffusion of water and/or glycol is so rapid that frequent replenishment of the water/glycol mixture is needed. If an LCP layer is included, the diffusion is greatly decreased.

In order to obtain rapid heat transfer through the HESM, thickness through the material between the heat transfer fluids should be a small as possible. This would be true with any material used for an HESM, but is especially important with plastics since their heat transfer coefficients are usually relatively low when compared to metals. Since the LCP is usually the more expensive of the polymers present in the HESM, it is economically preferable to limit its use. Therefore, in most constructions it is preferred that the LCP is present in relatively thin layer(s) and that layer(s) of the ITP be relatively thick so as to carry much of the structural load of the HESM (i.e., pressure of the fluid(s), maintain structural shape and dimensions, etc.).

The HESM is made up of one or more LCP layers and one or more layers of ITP. If more than one layer of LCP or ITP is present, more than one type of LCP or ITP, respectively, can be used. In addition other layers may be present. For example, so called tie layers, also called adhesive layers, may be used to increase the adhesion between various LCP and ITP layers, or between ITP layers or between LCP layers. The number and placement of the various layers in the HESM will vary depending on the particular polymers chosen, the fluids used in or by the heat exchanger, temperature requirements, environmental needs, etc.

Most commonly, tie layers and LCP layers will be relatively thin compared to the ITP layer(s). Typical constructions are given below, wherein Fluids 1 and 2 represent the fluids involved in the heat transfer:

(a) Fluid 1/LCP/ITP/Fluid 2
(b) Fluid 1/ITP-1/LCP/ITP-2/Fluid 2
(c) Fluid 1/LCP-1/ITP/LCP-2/Fluid 2
(d) Fluid 1/ITP-1/LCP-1/ITP-2/LCP-2/Fluid 2
(e) Fluid 1/ITP-1/ITP-2/LCP/Fluid 2
(f) Fluid 1/LCP-1/ITP-1/ITP-2/LCP-2/Fluid 2

In all of the above constructions, tie layers may be present between all, some or none of the various polymer layers.

Some of the above constructions may be particularly useful in certain situations. If Fluid 1 but not Fluid 2 chemically attacked the ITP, construction (a) may be particularly useful, but (c) and (f) may also be utilized. If both Fluids 1 and 2 attacked the ITP present construction (c) or (f) may be particularly useful. If one wanted to minimize diffusion of one fluid to another, a construction having two LCP layers, such as (c), (d) or (f) could be chosen. If a special surface is required to reduce abrasive damage on the Fluid 1 side, but great stiffness is also required from the ITP, a construction such as (e) could be chosen wherein ITP-1 and ITP-2 have the requisite properties. These and other combinations of layers having the correct properties for various applications will be obvious to the artisan.

Useful LCPs include those described in U.S. Pat. Nos. 3,991,013, 3,991,014, 4,011,199, 4,048,148, 4,075,262, 4,083,829, 4,118,372, 4,122,070, 4,130,545, 4,153,779, 4,159,365, 4,161,470, 4,169,933, 4,184,996, 4,189,549, 4,219,461, 4,232,143, 4,232,144, 4,245,082, 4,256,624, 4,269,965, 4,272,625, 4,370,466, 4,383,105, 4,447,592, 4,522,974, 4,617,369, 4,664,972, 4,684,712, 4,727,129, 4,727,131, 4,728,714, 4,749,769, 4,762,907, 4,778,927, 4,816,555, 4,849,499, 4,851,496, 4,851,497, 4,857,626, 4,864,013, 4,868,278, 4,882,410, 4,923,947, 4,999,416, 5,015,721, 5,015,722, 5,025,082, 5,086,158, 5,102,935, 5,110,896, and 5,143,956, and European Patent Application 356,226. Useful thermotropic LCPs include polyesters, poly (ester-amides), poly(ester-imides), and polyazomethines. Especially useful are LCPs that are polyesters or poly(ester-amides). It is also preferred in these polyesters or poly(ester-amides) that at least about 50 percent, more preferably at least about 75 percent, of the bonds to ester or amide groups, i.e., the free bonds of —C(O)O— and —C(O)NR$^1$— wherein R$^1$ is hydrogen or hydrocarbyl, be to carbon atoms which are part of aromatic rings. Included within the definition herein of an LCP is a blend of 2 or more LCPs or a blend of an LCP with one or more ITPs wherein the LCP is the continuous phase.

Useful ITPs are those that have the requisite properties as described above, and include: polyolefins such as polyethylene and polypropylene; polyesters such as poly(ethylene terephthalate, poly(butylene terephthalate), poly(ethylene 2,6-napthalate), and a polyester from 2,2-bis(4-hydroxyphenyl)propane and a combination of isophthalic and terephthalic acids; styrenics such as polystyrene and copolymers of styrene with (meth)acrylic esters; acrylonitrile-butadiene-styrene thermoplastics; (meth) acrylic polymers including homo- and copolymers of the parent acids, and/or their esters and/or amides; polyacetals such as polymethylene oxide; fully and partially fluoropolymers such as polytetrafluoroethylene, polychlorotrifluoroethylene, poly(tetrafluoroethylene/ hexafluoropropylene) copolymers, poly[tetrafluoroethylene/ perfluoro(propyl vinyl ether)] copolymers, poly(vinyl fluoride), poly(vinylidene fluoride), and poly(vinyl fluoride/ ethylene) copolymers; ionomers such as an ionomer of an ethylene-acrylic acid copolymer; polycarbonates; poly (amide-imides); poly(ester-carbonates); poly(imide-ethers); polymethylpentene; linear polyolefins such as polypropylene; poly(etherketoneketone); polyimides; poly(phenylene sulfide); polymers of cyclic olefins; poly(vinylidene chloride); polysulfones; poly(ether-sulfones); and polyamides such as nylon-6,6 nylon-6, nylon-6,12, nylon-6,12, nylon 4,6, and the polyamides from terephthalic acid and/or isophthalic acid and 1,6-hexanediamine and/or 2-methyl-1, 5-pentanediamine. Polyamides are preferred ITPs and preferred amides are nylon-6,6, nylon-6, and a copolymer of terephthalic acid with 1,6-hexandiamine and 2-methyl-1,5-pentanediamine wherein 1,6-hexanediamine is about 30 to about 70 mole percent of the total diamine used to prepare the polymer. Especially preferred polyamides are nylon-6,6, nylon-6 and a copolymer of terephthalic acid with 1,6-hexandiamine and 2-methyl-1,5-pentanediamine wherein 1,6-hexanediamine is about 50 mole percent of the total diamine used to prepare the polymer. Included within the definition of ITP herein are blends of 2 or more ITPs or blends of one or more ITPs with an LCP provided that the ITP(s) is the continuous phase.

One or more (if present) of the ITPs may be toughened. Toughening is known in the art, and may be accomplished by adding one or more or a rubber, functionalized rubber, resin which reacts with the ITP such as an epoxy resin, or other materials. Toughened polyamides are preferred.

The polymers may contain other materials conventionally found in polymers, such as fillers, reinforcing agents, antioxidants, antiozonants, dyes, pigments, etc. An especially useful material is a filler with high heat conductivity, which may increase the efficiency of the heat exchanger.

The composition of a tie layer will depend on which two polymers are on either side of it. For instance the tie layer may be an ITP functionalized or grafted to provide adhesion between the ITP and LCP layers, or may be a blend of one or more ITPs and one or more LCPs.

Typical thicknesses for ITP layers will range from about 0.025 to about 0.25 mm. Typical thicknesses for LCP layers will be about 0.01 to about 0.1 mm. Tie layers will usually be as thin as possible, consistent with their providing adhesion between polymer layers. This is usually about 0.01 to about 0.1 mm. The total thickness of the structure is preferably less than about 0.7 mm, more preferably about 0.12 to about 0.5 mm, and especially preferably about 0.15 mm to about 0.4 mm.

Heat exchangers of many different configurations are, made and used, see for instance R. K. Shah, et al., in W. Gerhartz, et al., Ed., Ullmann's Encyclopedia of Industrial Chemistry, 5th Ed., Vol. B-3, VCH Verlagsgesellschaft mbH, Weinheim, 1988, p. 2-1 to 2-108. As can be seen from this article, and is well known in the art, probably the two most common heat exchange "elements" are the tube and the plate. In a tube type heat exchanger one of the fluids flow through a usually circular cross sectioned tube, while the other fluid flows on the exterior of the tube. Usually many small tubes are employed to create a large heat exchange surface. Sometimes the tubes may be finned for more efficient heat transfer. In a plate element, small passageways, akin to small tubes, are fabricated within a plate of the heat exchange material. One of the fluids flows on the inside of the passageways while the other fluid flows over the exterior surface of the plates. The passageways are usually small to increase surface area, and multiple plates are often used. All of the discussion about heat exchange surface materials also applies to heat exchange panels.

For tube type heat exchangers, the multilayer material described herein can be made by multilayer coextrusion of a tube, see for instance U.S. Pat. No. 5,288,529. However, LCPs when so extruded tend to be weak in the transverse direction (perpendicular to the long axis of the tube). Such problems can be solved by using a counterrotating die for the LCP portion of the extruded tube, as described in U.S. Pat. Nos. 4,963,428 and 4,966,807, and G. W. Farell, et al., Journal of Polymer Engineering, vol. 6, p. 263–289 (1986). The tubes can be assembled into a full heat exchanger by inserting them into tanks with proper size holes and sealing the holes with a filler such as epoxy resin, or by heat sealing.

Heat exchanger plates of the layered material described herein may be made by relatively standard methods. They may be directly coextruded, complete with passages in them. A flat sheet or film may be coextruded, thermoformed into the correct shape and joined adhesively or by heat into the plate. Such coextrusions are known processes, see for instance H. Mar, et al., Ed., Encyclopedia of Polymer Science and Engineering, 2nd Ed., Vol. 6, John Wiley & Sons, New York, 1986, p. 608–613, ibid., Vol. 7, 1987, p. 106–127, all of which is hereby included by reference. Individual films or sheets of the ITP(s) and LCP(s) may be laminated together, then formed into a heat exchanger plate. For fabrication of a plastic heat exchanger made with plates see U.S. Pat. No. 4,955,435.

The heat exchangers described herein are useful for automotive and other vehicle uses, in aircraft, as comfort heat exchangers, and various ventilating, heating and air conditioning applications. They are particularly useful as liquid-gas heat exchangers used to cool automotive gasoline or diesel engines. In that case the liquid is water, water and a glycol, or water and an alcohol.

Unless otherwise noted, the LCP used in all Examples is an aromatic polyester made from the following monomers: 4,4'-biphenol/hydroquinone/terephthalic acid/2,6-naphthalene dicarboxylic acid/4-hydroxybenzoic acid/6-hydroxy-2-naphthoic acid (mole ratio 50/50/70/30/270/50) with a melting point of ~266° C. (by Differential Scanning Calorimetry, DSC) and a Tg (also by DSC) of about 110–120° C.

EXAMPLE 1

A LCP film 25 $\mu$m thick was cut into a circle with a 7.6 cm diameter. The film was used as a "lid" of an aluminum cup containing ethylene glycol:water mixture (a used ~1:1 ratio of commercial automotive antifreeze and water, radiator fluid), secured between metal rings and gaskets to avoid leakage and was placed in the inverted position (so that the liquid would contact the film) in an oven at 100° C. Periodically, the cup was removed from the oven, cooled and weighed and placed back in the oven. The repeated cooling and reheating made the film concave or convex because of the pressure differences inside the cup as a consequence of the temperature variations. This induces a repeated fatigue stress which can be qualitatively observed, but was not measured.

In this test two separate cups were tested. In one some mechanical leaks were noticed. The seal was subsequently tightened and the tests continued. The second specimen appeared intact. Over a period of 13 days the gross weight loss was 0.43 gram which amounts to 0.42 g/100 in$^2$/mil/24 h. The second cup, after tightening the leaks lost 0.88 g which translates to 0.94 g/100 sq.in/24 h/mil, a small number considering the leaks.

EXAMPLE 2

Similar equipment as in Example 1 was used. Two sample films with thickness of 25–38 $\mu$m of the same polymer were used. They survived the rigors of the exposure at 100° C. as well as the repeated cycling from 100° C. to room temperatures and back to 100° C. (during the time required to remove it from the oven for weighing, which took about 15 min, each time the weighing occurred). The loss in weight after 250 days of exposure was 4.98 grams and 10.57 grams respectively in the 2 specimens, which translates to weight losses 0.278 and 0.592 g/100 in$^2$/24 h, respectively.

EXAMPLE 3

Studies similar to those of Examples 1 and 2 were carried out using a film made by extrusion of nylon-6,6. The film thickness was 76 μm. Under similar testing conditions, lasting 18 days, 21 hours, they lost 11.05 g (avg. of two specimens). This translates to a permeation rate of 25.6 g/100 in$^2$/24 h/mil.

EXAMPLE 4

Small diameter tubing (~0.37 cm diameter and 250–310 μm wall thickness) was made with multilayer construction, nylon 66/LCP/nylon 66, using three extruders and a die to separately feed the different materials as separate layers. The LCP layer was about 51 μm thick. The tubing was sealed at one end, then filled with a 1:1 (vol.) mixture of commercial automotive antifreeze and water, subsequently sealed at the other end and then placed in an oven maintained at 100° C. The loss of the fluid with respect to time, was obtained by weighing. The loss was found to be 0.5 gm/100 in$^2$ tubing surface area/24 h.

EXAMPLE 5

A heat exchanger was constructed from nylon-6,6 tubing (OD 0.366 cm, ID 0.328 cm) with 5.21 m$^2$ of active surface area. Hot water (81° C.) was circulated through the exchanger while ambient air was passed across the surface of the tubes. Over a period of 109.5 hr, water loss via permeation was 1160 gm, equivalent to a water loss rate per unit active surface area of 48.8 gm/m$^2$/24 hr.

EXAMPLE 6

A heat exchanger was constructed from coextruded tubing (OD 0.366 cm, ID 0.328 cm) of configuration (inside of tube to outside) 64 μm "HTN" nylon/51 μm LCP/76 μm HTN nylon and active surface area of 1.959 m$^2$. The HTN is a blend of a polyamide which is a copolymer of 1,6-hexanediamine and 2-methyl-1,5-pentanediamine (1:1 mole ratio) and terephthalic acid, with a synthetic rubber (Nordel® 3681, and is EPDM-type rubber, available from E. I. DuPont de Nemours & Co., Wilmington, Del., 19898) and a functionalized synthetic rubber (which is a maleic anhydride functionalized EPDM) in an 85/15/5 weight ratio, respectively.

Operation as per Example 5 over a total of 24 days resulted in a loss of 201 gm water, equivalent to a water loss rate of 4.3 gm/m$^2$/24 h.

EXAMPLE 7

A film of the following composition was produced by the blown film coextrusion method:

| layer 1 | nylon 6/Sclair ® 11K1$^a$/Fusabond ® D226$^b$/a functionalized synthetic rubber$^c$ (72.5/13.6/6.8/6.8 weight percent) | 0.05 mm |
|---|---|---|
| layer 2 | XB603 (functionalized EMA) | 0.01 mm |
| layer 3 | LCP | 0.01 mm |
| layer 4 | XB603 | 0.01 mm |
| layer 5 | LCP | 0.01 mm |
| layer 6 | XB603 | 0.01 mm |
| layer 7 | Same as Layer 1 | 0.05 mm |

$^a$LLDPE available from Nova Chemicals, Calgary, Alberta, Canada.
$^b$A maleic anhydride grafted LLDPE available from E. I. duPont de Nemours & Co., Wilmington, DE U.S.A.
$^c$A maleic anhydride functionalized EPDM.

The LCP used was a polymer of the following monomers in the bracketed molar ratios: 4,4'-biphenol(26.3)/hydroquinone(26.3)/1,6-hexanediamine(47.4)/terephthalic acid(36.8)/2,6-naphthalene dicarboxylic acid(63.2)/4-hydroxybenzoic acid(89.5)/6-hydroxy-2-napthoic acid (36.8). Melting point (DSC) of this LCP was 265° C.

Evaluation of this film as per Example 1 above, at 60° C., showed a fluid loss of 0.81 gm/100 in$^2$/day. A film (0.19 mm thick) of nylon-6,6 blended with synthetic rubber (Nordel® 3681) and functionalized synthetic rubber (which is an EPDM grafted with maleic anhydride) in an 80/10/10 weight ratio respectively and also containing less than 1 weight percent of an epoxy resin, showed a loss of 10.27 gm/100 in$^2$/day under the same conditions.

EXAMPLE 8

Tubing was extruded with the following configuration (inside to outside of tube) and outer diameter 3.6 mm;

| inside layer | LCP | 0.05 mm |
|---|---|---|
| middle layer | XB603 | 0.05 mm |
| outer layer | nylon 6,6 | 0.075 mm |

The LCP used was a polymer of the following monomers in the bracketed molar ratios: 4,4'-biphenol(35.5)/hydroquinone(35.5)/1,6-hexanediamine(29.0)/terephthalic acid(60)/2,6-naphthalene dicarboxylic acid(40)/4-hydroxybenzoic acid(130). The melting point (DSC) of this LCP was 255° C.

Evaluation as per Example 4 at 38° C. showed a loss of 0.02 gm/100 in$^2$/day; nylon 6.6 tubing of the same dimensions showed a loss of 2.04 gm/100 in$^2$/day.

EXAMPLE 9

Polymer A was a liquid crystalline polymer which was an aromatic polyester, and was a copolymer of (molar ratios in parentheses): 4,4'-biphenol(26.3)/hydroquinone(26.3)/1,6-hexanediamine(47.4)/terephthalic acid(36.8)/2,6-naphthalene dicarboxylic acid(63.2)/4-hydroxybenzoic acid (89.5)/6-hydroxy-2-napthoic acid(36.8).

Polymer B was a nylon 6/Sclair® 11K1$^a$/Fusabond® D226$^b$/a functionalized synthetic rubber$^c$ (72.5/13.6/6.8/6.8 weight percent ($^a$LLDPE available from Nova Chemicals, Calgary, Alberta, Canada; $^b$A maleic anhydride grafted LLDPE available from E. I. duPont de Nemours & Co., Wilmington, Del. U.S.A.; $^c$A maleic anhydride functionalized EPDM.)

Polymer C was a blend prepared in a twin screw extruder of 40 percent by weight of Polymer A and 60 percent by weight of Polymer B.

The apparatus used included a ¾" (1.91 cm) Brabender (Type 2003, C. W. Brabender Instruments, Hackensack, N.J., U.S.A.), a 1" (2.54 cm) Wilmod extruder, and a 3.8 cm NRM extruder. Polymer A was extruded from the Wilmod extruder running at 45 rpm and the melt temperature was 280° C. Polymer B was extruded from the NRM extruder running at 20 rpm and at a melt temperature of 280° C. Polymer C was extruded from the Brabender extruder running at 60 rpm and with a melt temperature of 270° C. The output of each of these extruders was fed to 15.2 cm wide film die which was configured to handle three separate feeds. Polymers A and B were the outside layers and Polymer C was the inner layer.

The molten film fell by gravity on the oscillating rollers, which were arranged as shown in FIG. 1. The rollers were 8.9 cm in diameter and 20.3 cm wide, and the surfaces were faced with stainless steel which were embossed with a diamond or knurled pattern, about 50–75 $\mu$m deep, with a 90° included angle for the sides, with the knurling lines at an angle of 30° to the axis of rotation of the roll. The rotational speeds of the rollers were manually controlled using a variable speed drive motor, set so the surface speed of the rolls was 6 m/min. The rate of oscillation was also manually controlled by a variable speed drive motor and was 50 Hz, while the amplitude of oscillation could be varied by changing the cam 17, and was 1.3 mm. Each roller was individually heated by Calrod® electrical heaters, which were in turn automatically controlled by digital controllers. It is believed that the roller temperatures could be maintained to about ±1° C., and the roller temperatures were 177° C. After passing through the oscillating rollers the film was passed through a set of cooling rolls and then rolled up on a roll.

In the beginning of the run, the speed of extrusion and rotation of the oscillating rollers were adjusted so that a rolling bank of the polymer built up on the oscillating rollers, and then the speed of the oscillating rollers was set as closely as possible to maintain a constant sized rolling bank. Occasionally some manual adjustments were needed.

In the resulting film, the Polymer a layer was about 0.051 mm thick, the Polymer B layer was about 0.10 mm thick and the Polymer C layer was about 0.051 mm thick.

Using the above three-layer film, heat exchanger panels were made using the procedure of Example 2 of U.S. Pat. No. 5,050,671, as described below.

The sheets were coated on the Polymer B side with a solution of benzyl alcohol and phenol, as described in U.S. Pat. No. 4,935,462. The coated sides were placed in face-to-face contact, between female molds containing grooves parallel to the long axis of the sheets, with inlet and outlet headers at each end of the sheets. The molds were then heated in a press at 160° C. and 241 MPa pressure was applied while nitrogen gas was passed between the sheets so that each sheet conformed to the shape of the grooves, the two sheets were bonded together, and the headers were bonded to the ends of the sheets. No fractures or tears were evident in the resulting panel in the outer surfaces (which were Polymer A). The headers of several of these panels were bonded together to form a heat exchanger.

An otherwise identical heat exchanger was made from 0.2 mm thick sheeting of Polymer B (the sheeting didn't go through the oscillating rollers). Water at 70° C. was passed through the two heat exchangers, and the rate of water loss by diffusion through the panels measured. The rate of water loss for the heat exchanger made with the three-polymer layer panels was about 0.8 g/hr, more than 10 times less than that of the heat exchanger made from Polymer B alone which had a water loss rate of about 9.1 g/hr.

What is claimed is:

1. A heat exchanger comprising a plastic heat exchange surface material, said heat exchanger surface material comprising a multilayer material which comprises a layer of a thermotropic liquid crystalline polymer and a layer of isotropic thermoplastic, said heat exchange surface material having two sides, a first side in contact with a first fluid flowing past such first side, and a second side in contact with a second fluid flowing past such second side, wherein said heat exchange surface material separates said first fluid and said second fluid.

2. The heat exchanger as recited in claim 1 which is a liquid-liquid heat exchanger.

3. The heat exchanger as recited in claim 1 which is a liquid-gas heat exchanger.

4. The heat exchanger as recited in claim 1 which is a gas-gas heat exchanger.

5. The heat exchanger as recited in claim 1 which is part of an automobile or other vehicle, an aircraft, a comfort heat exchanger, a heater, an air conditioner, or a ventilator.

6. The liquid gas heat exchanger as recited in claim 3 which is a cooler for an automotive gasoline or diesel engine.

7. The heat exchanger as recited in claim 6 wherein said liquid is water, water and a glycol, or water and an alcohol, as said gas is air.

8. The heat exchanger as recited in claim 1 which is a tube heat exchanger.

9. The heat exchanger as recited in claim 1 which is a plate heat exchanger.

10. The heat exchanger as recited in claim 1 where said thermotropic liquid crystalline polymer is a polyester or a poly(ester-amide).

11. The heat exchanger as recited in claim 10 wherein at least about 50 mole percent total of bonds to amide and ester groups are to carbon atoms which are part of aromatic rings.

12. The heat exchanger as recited in claim 1 wherein said thermoplastic is a polyamide.

13. The heat exchanger as recited in claim 6 or 7 wherein said isotropic thermoplastic is a polyamide.

14. The heat exchanger as recited in claim 13 wherein said thermotropic liquid crystalline polymer is a polyester or a poly(ester-amide).

15. The heat exchanger as recited in claim 12, wherein said polyamide is nylon-6, nylon-6,6, or a copolymer of terephthalic acid, 1,6-diaminohexane and 2-methyl-1,5-diaminopentane wherein said 1,6-diaminohexane is about 30 to 70 mole percent of total diamine present.

16. The heat exchanger as recited in claim 13 wherein said polyamide is nylon-6, nylon-6,6, or a copolymer of terephthalic acid, 1,6-diaminohexane and 2-methyl-1,5-diaminopentane wherein said 1,6-diaminohexane is about 50 mole percent of total diamine present.

17. The heat exchanger as recited in claim 14 wherein said polyamide is nylon-6, nylon-6,6, or a copolymer of terephthalic acid, 1,6-diaminohexane and 2-methyl-1,5-diaminopentane wherein said 1,6-diaminohexane is about 30 to about 70 mole percent of the total diamine present.

18. The heat exchanger as recited in claim 1 wherein one or more tie layers are also present in said heat exchange surface material.

19. The heat exchanger as recited in claim 1, wherein:
   (a) two or more layers of said thermotropic liquid polymer are present; or
   (b) two or more layers of said isotropic thermoplastic are present; or
   (c) two or more layers of said thermotropic liquid crystalline polymer and two or more layers of said isotropic thermoplastic are present.

* * * * *